United States Patent
Martin

(10) Patent No.: US 7,080,375 B2
(45) Date of Patent: Jul. 18, 2006

(54) PARALLEL DISPATCH WAIT SIGNALING METHOD, METHOD FOR REDUCING CONTENTION OF HIGHLY CONTENDED DISPATCHER LOCK, AND RELATED OPERATING SYSTEMS, MULTIPROCESSOR COMPUTER SYSTEMS AND PRODUCTS

(75) Inventor: Brian James Martin, Redmond, WA (US)

(73) Assignee: EMC Corporation/Data General, Hopkinton, MA (US)

(*) Notice: Subject to any disclaimer, the term of this patent is extended or adjusted under 35 U.S.C. 154(b) by 783 days.

(21) Appl. No.: 09/751,659

(22) Filed: Dec. 30, 2000

(65) Prior Publication Data

US 2002/0087736 A1    Jul. 4, 2002

(51) Int. Cl.
*G06F 9/46* (2006.01)
*G06F 11/30* (2006.01)
*G06F 7/00* (2006.01)

(52) U.S. Cl. ............................ 718/100; 713/193; 707/9
(58) Field of Classification Search ............ 718/1–108; 719/300; 709/200; 713/193; 707/9
See application file for complete search history.

(56) References Cited

U.S. PATENT DOCUMENTS

| 4,807,111 | A | * | 2/1989 | Cohen et al. | .................. 710/54 |
|---|---|---|---|---|---|
| 5,721,943 | A | * | 2/1998 | Johnson | ....................... 713/300 |
| 5,826,081 | A | * | 10/1998 | Zolnowsky | ................. 718/103 |
| 5,887,146 | A |  | 3/1999 | Baxter et al. | |
| 6,502,103 | B1 | * | 12/2002 | Frey et al. | .............. 707/103 R |
| 6,718,334 | B1 | * | 4/2004 | Han | ........................... 707/102 |

OTHER PUBLICATIONS

Hanrahan, Jamie, "Re: Preemptive context switch", Google Groups, Newsgroups: comp.os.ms-windows.programmer.nt.kernel-mode, Aug. 1, 1997.*
Solomon, David A., "Processes and Threads", Inside Windows NT, 2nd Ed., pp. 141-215 (1998).
Martin, B. J. ,etal., U.S. Appl. No. 09/675,396, filed Sep. 29, 2000.

* cited by examiner

*Primary Examiner*—Meng-Al T. An
*Assistant Examiner*—Kenneth Tang
(74) *Attorney, Agent, or Firm*—Wiliiam J. Daley, Jr.; George N. Chaclas; Edwards Angell Palmer & Dodge, LLP

(57) ABSTRACT

Featured is a method for reducing the contention of the highly contended global lock(s) of an operating system, hereinafter dispatcher lock(s) that protects all dispatching structures. Such a method reduces the need for acquiring the global lock for many event notification tasks by introducing local locks for event notifications that occur frequently among well defined, or consistent dispatcher objects. For these frequently occurring event notifications a subset of the dispatching structure is locked thereby providing mutual exclusivity for the subset and allowing concurrent dispatching for one or more of other data structure subsets. The method also includes acquiring one or more local locks where the level of protection of the data structure requires locking of a plurality or more of data structures to provide mutual exclusivity. The method further includes acquiring all local locks and/or acquiring a global lock of the system wide dispatcher data structures wherever a system wide lock is required to provide mutual exclusivity.

32 Claims, 12 Drawing Sheets

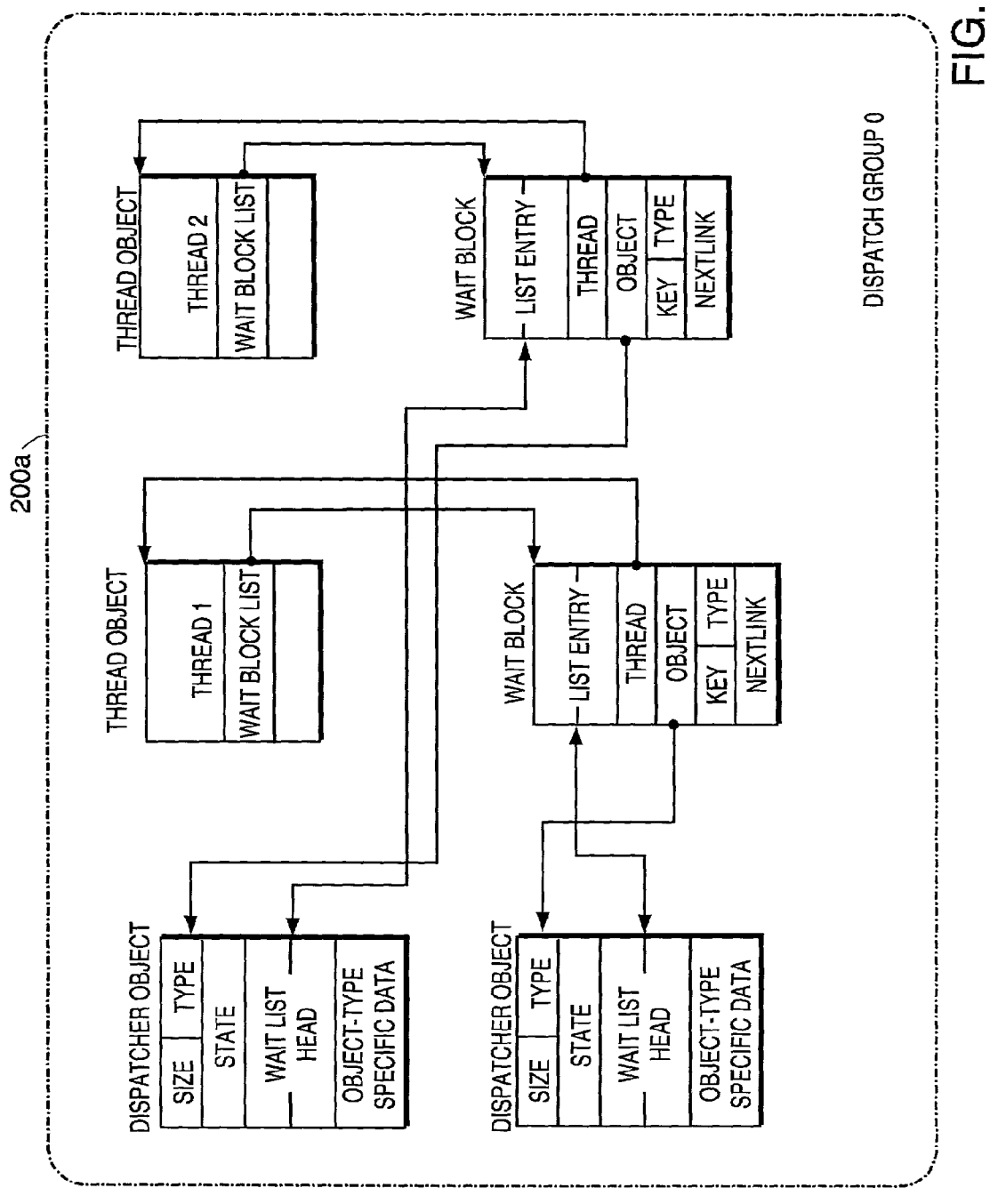

PARALLEL DISPATCH WAIT SIGNALING METHOD, METHOD FOR REDUCING CONTENTION OF HIGHLY CONTENDED DISPATCHER LOCK, AND RELATED OPERATING SYSTEMS, MULTIPROCESSOR COMPUTER SYSTEMS AND PRODUCTS

FIELD OF INVENTION

The present invention relates to operating systems and related methods for multi-processor computer systems and more particularly to an operating system and method for dispatching/wait signaling of a multi-processor computer system, more specifically an operating system and method in which a system wide global dispatching lock is not a requisite to performing the dispatching operation.

BACKGROUND OF THE INVENTION

Many current computer systems employ a multi-processor configuration that includes two or more processing units interconnected by a bus system and each being capable of independent or cooperative operation. Such a multi-processor configuration increases the total system processing capability and allows the concurrent execution of multiple related or separate tasks by assigning each task to one or more processors. Such systems also typically include a plurality of mass storage units, such as disk drive devices to provide adequate storage capacity for the number of task executing on the systems.

One type of multi-processor computer system embodies a symmetric multiprocessing (SMP) computer architecture, which is well known in the art as overcoming the limitations of single or uni-processors in terms of processing speed and transaction throughput, among other things. Typical, commercially available SMP systems are generally "shared memory" systems, characterized in that multiple processors on a bus, or a plurality of busses, share a single global memory or shared memory. In shared memory multiprocessors, all memory is uniformly accessible to each processor, which simplifies the task of dynamic load distribution. Processing of complex tasks can be distributed among various processors in the multiprocessor system while data used in the processing is substantially equally available to each of the processors undertaking any portion of the complex task. Similarly, programmers writing code for typical shared memory SMP systems do not need to be concerned with issues of data partitioning, as each of the processors has access to and shares the same, consistent global memory.

There is shown in FIG. 1 a block diagram of an exemplary multiprocessor system that implements an SMP architecture. For further details regarding this system, reference shall be made to U.S. Ser. No. 09/309,012, filed Sep. 3, 1999, the teachings of which are incorporated herein by reference.

Another computer architecture known in the art for use in a multi-processor environment is the Non-Uniform Memory Access (NUMA) architecture or the Cache Coherent Non-Uniform Memory Access (CCNUMA) architecture, which are known in the art as being an extension of SMP but which supplants SMPs "shared memory architecture." NUMA and CCNUMA architectures are typically characterized as having distributed global memory. Generally, NUMA/CCNUMA machines consist of a number of processing nodes connected through a high bandwidth, low latency interconnection network. The processing nodes are each comprised of one or more high-performance processors, associated cache, and a portion of a global shared memory. Each node or group of processors has near and far memory, near memory being resident on the same physical circuit board, directly accessible to the node's processors through a local bus, and far memory being resident on other nodes and being accessible over a main system interconnect or backbone. Cache coherence, i.e. the consistency and integrity of shared data stored in multiple caches, is typically maintained by a directory-based, write-invalidate cache coherency protocol, as known in the art. To determine the status of caches, each processing node typically has a directory memory corresponding to its respective portion of the shared physical memory. For each line or discrete addressable block of memory, the directory memory stores an indication of remote nodes that are caching that same line.

There is shown in FIG. 2 a high-level block diagram of another exemplary multiprocessor system but which implements a CCNUMA architecture. For further details regarding this system, reference shall be made to U.S. Pat. No. 5,887,146, the teachings of which are incorporated herein by reference.

As is known to those skilled in the art, each of these multiprocessor computer systems includes an operating system that is executed on these systems so that software programs (e.g., spreadsheet, word processing programs, etc.) are executed on these multiprocessor systems, to control the access of these programs when being executed to various resources such as computer readable medium (e.g. hard drives), output media (e.g., printers), communications media (e.g., modem), and to control the execution of the one or more programs being executed/accessed on the multiprocessor computer system at or about the same time.

Before proceeding with describing prior art operating systems for use on multiprocessor computer systems, in particular dispatching, an understanding as to what certain terms are intended to mean is first undertaken. Although programs and processes appear similar on the surface, they are fundamentality different. A program is a static sequence of instructions, whereas a process is a set of resources reserved for the thread(s) that execute the program. For example, at the highest level of abstraction a process in a Windows NT environment comprises the following: an executable program, which defines initial code and data; a private virtual address space, which is a set of virtual memory addresses that the process can use; system resources, such as semaphores, communications ports, and files, that the operating system allocates to the process when threads open them during the program's execution; a unique identifier called a process ID (internally called a client ID); and at least one thread of execution.

A thread is the entity within a process that the operating system schedules for execution, without it the process's program cannot run. A thread typically includes the following components: the contents of a set of volatile registers representing the state of the processor; two stacks, one for the thread to use while executing in the kernel mode and one for executing in the user mode; a private storage area for use by subsystems, run-time libraries, and dynamic link libraries (DLLs); and a unique identified called a thread identifier (also internally called a client ID), process IDs and thread IDs are generated out of the same namespace, so they do not overlap. The volatile registers, the stacks and the private storage areas are called the thread's context. Because this information is different for each machine architecture that the operating system runs on, this structure is architecture specific.

Although threads have their own execution context, every thread within a process shares the process's virtual address space in addition to the rest of the resources belonging to the process. This means that all of the threads in a process can write to and read from each other's memory. Threads cannot reference the address space of another process, unless the other process makes available part of its private address as a shared memory section. In addition, to a private address space and one or more threads, each process has a list of open handles to objects such as files, shared memory sections, one or more synchronization objects such a mutexes, events or semaphores.

The kernel component of the operating system, sometimes referred to simply as the kernel, performs the most fundamental operations in the operating system, determining how the operating system uses the processor or processors and ensuring that the processor(s) are used prudently. The primary functions of the kernel included, thread scheduling and dispatching, trap handling and exception dispatching, multiprocessor synchronization and providing the base kernel objects that are used by the operating system executive. The kernel also handles context swapping, kernel event notification, IO and memory management. The kernel of a multi-processor computer system, more specifically determines which threads or processes run on which processors and also determines when the thread/process will run on a given processor.

The dispatcher is that part of the kernel that focuses on the scheduling function of when and where to run processes, more particularly the threads of such processes. The dispatcher also controls how long each thread can be allowed to run before being preempted to run another thread. Reference is made herein to Chapter 4 of "Inside Windows NT", Second Edition, A. Solomon, 1988, the teachings of which are incorporated herein by reference, for further details as to the general process in a Windows NT environment for inter alia thread scheduling.

A crucial concept in operating systems is typically referred to as mutual exclusion and generally refers to making sure that one, and only one, thread can access a particular resource at a time. Mutual exclusion is necessary when a resource does not lend itself to shared access or when sharing would result in an unpredictable outcome. For example, the output of two threads from two files being copied to a printer port at the same time could become intermingled. Similarly, if one thread is reading from a memory address at the same time another thread is writing to the same address, the data being read by the first thread becomes unpredictable or unusable.

This concept of mutual exclusion is of particular concern for multi-processor computing systems because code is being run simultaneously on more than one processors, which code shares certain data structures stored in the particular form of system memory of the SMP or NUMA type of multi-processor system. Thus for multi-processor computing systems the kernel typically is configured to provide mutual exclusion primitives that it and the rest of the operating system executive use to synchronize their access to global data structures. The mechanism by which the kernel achieves multi-processor mutual exclusivity is a locking mechanism associated with the global data structure, commonly implemented as a spinlock. Thus, before entering and updating a global data structure, the kernel first acquires the spinlock and locks the global data structure. The kernel then updates the data structure and after updating the data structure, the spinlock is released.

One widely held and highly contended spinlock is the kernel dispatcher lock that provides a mechanism for protecting all data structures associated with thread execution, context swapping and kernel event notification. Because event notification can result in a change of executing thread and/or context swap, some operating systems including for example Windows NT utilize a single global lock to protect all dispatching data structures. The current dispatcher design, with reference to FIG. 3, implements a structure whereby the execution of threads of all processes coordinate wait notification through defined wait blocks. These software constructs allow any thread in the system to wait for any other dispatcher object in the system to be signaled.

There is shown in FIG. 3 illustrative wait data structures that show the relationship of dispatcher object to wait blocks to threads. In this illustrative example, none of the threads are being executed because they are waiting on dispatcher objects. As is also illustrated, thread 1 is waiting on both visible dispatcher objects and threads 2 and 3 are each waiting on only one of the two dispatcher objects. Thus, if only one of the two visible objects is signaled, the kernel will see that because thread 1 is also waiting on another object it cannot be readied for execution. On the other hand, the kernel will see that the thread waiting on the dispatcher object that is signaling can be readied for execution because it isn't waiting on other objects. There also is shown in FIG. 4 some selected kernel dispatcher objects as well as illustrating system events that can induce a change in the state of a thread(s), and the effect of the signaled state on waiting threads. In the case of an IO the completion of a DMA operation may signal a dispatcher object and a waiting thread would be readied for execution when the kernel dispatcher determines that the dispatcher object indicating the completion of DMA operation/IO process and referenced by (linked to) the waiting thread has been signaled.

Now referring to FIG. 5 there is shown a high level flow diagram illustrating the process followed to reschedule execution of a thread and updating of the data structure associated with dispatching. When the execution of a running thread is pre-empted, terminated or otherwise stopped, the kernel locks the entire dispatch database and examines the dispatch database structure to identify the next thread to be executed, STEPS 102, 104. This determination is achieved using any of a number of techniques and criteria known to those skilled in that art and is typically particular to the specific operating system. As noted above, some illustrative criterion are provided in Chapter 4 of "Inside Windows NT" for the scheduling of threads. In a multiprocessor computing system, such identification also includes identifying the processor on which the released or readied thread is to be executed.

The kernel then updates the dispatch database, STEP 106. For example, the kernel updates the database to note the change in state of the thread to be executed on a processor. The kernel also would evaluate the wait list or wait list structure and update it based on the actions taken to preempt or stop the thread that had been running. If it is determined that the thread which had been pre-empted or otherwise stopped (e.g., timer expiring) is to continue running then the kernel would update the database based on the added quantum or time the thread is to be run. Once, all of the updating, evaluating is completed, the kernel releases the global dispatcher lock, STEP 108. Thereafter, the identified readied or released thread is executed on the identified processor.

As noted above, the dispatcher lock is a global lock that prevents any other thread rescheduling to occur until the lock is released. Because each of the processes running on a multi-processor computing system involve or require thread scheduling/rescheduling, the scheduling of execution of the threads for different processes are in competition with each other no matter how simple or brief the process the kernel follows for dispatching. Likewise, because the notification (signaling) and querying of dispatcher objects (events) is also involved in the execution of many threads, these operations also are in competition with each other. Additionally, the dispatching process performed by the kernel becomes increasingly more time consuming as more concurrent thread rescheduling or event notification operations are performed and therefore contend for the dispatcher spinlock. Further, while the dispatching operation is being performed for one thread, the dispatching of other threads presently stopped and needing to be re-scheduled cannot be accomplished, and thus the applications processes/processors for these other threads are unable to proceed (i.e., pended or delayed). Consequently, the time to perform a task by the applications program/process is in effect increased by such delays.

It thus would be desirable to provide a methodology and operating system particularly for multi-processor computing systems that would allow parallel dispatching, at least for frequently occurring events, without having to employ a system wide global lock of the dispatching database or structure. It would be particularly desirable to provide such a methodology and operating system having a plurality of local locks for dispatching, each of the plurality of local locks locking a grouping of dispatchable objects. It also would be desirable to provide a multiprocessor computing system and/or software for execution on such systems embodying such methodologies. Further, it would be desirable to provide such, methods, operating systems, and multiprocessor computing systems that reduce the amount of time to perform a task in comparison to that provided using prior art dispatching methods.

SUMMARY OF THE INVENTION

The present invention features a method for reducing the contention of the highly contended global lock(s) of an operating system, hereinafter dispatcher lock(s) that protects all dispatching structures. More particularly, such a method reduces the need for acquiring the global lock for many event notification tasks by introducing local locks for event notifications that occur frequently among well defined, or consistent dispatcher objects. For these frequently occurring event notifications a subset of the dispatching structure is locked thereby providing mutual exclusivity for the subset and allowing concurrent dispatching for one or more of other data structure subsets. Such a method also includes acquiring one or more local locks where the level of protection of the data structure requires locking of a plurality or more of data structure to provide mutual exclusivity. Such a method further includes acquiring all local locks and/or acquiring a global lock of the system wide dispatcher data structures wherever a system wide local is required to provide mutual exclusivity. In this way, only those portions of the dispatching data structure needing to be locked are locked, thereby providing a mechanism that allows parallel dispatching across the multiprocessor computing system.

In a well-tuned multiprocessing environment, many kernel notification or signaling events frequently occur between a given set of one or more resources and a given set of one or more executing threads. The collection of threads, resources and events that frequently interact with only each other are referred to as a group or a dispatch group. According to the methodology of the present invention, the single global lock protecting all dispatch data structures and dispatching wait signaling in the operating system is replaced with one or more local locks that are configured to protect separate dispatch groups. Each dispatchable object of each given dispatch group, including threads, is assigned a group identifier, unique for that given dispatch group. Using this identifier, the dispatch code paths in the operating system are optimized to acquire only the locks corresponding to the thread(s) and dispatch object(s) being waited on. Such optimization can be achieved using the methodology as set forth in U.S. Ser. No. 09/675,396 filed Sep. 29, 2000 the teachings of which are incorporated herein by reference. In an exemplary embodiment, the dispatch group identifier is implemented as either a portion of an existing field in the dispatch header for each dispatchable object or as a new field in the dispatch header.

In the case of a CCNUMA type of multiprocessor computing system, dispatching activity can occur within groups comprised of individual NUMA nodes or blocks of such nodes. In such a case, the dispatcher groups would be defined by such nodes or blocks and the group identifier.

In another aspect of the present invention, threads are assigned to a default group upon creation based on the processor affinity mask, or are left unassigned. Other dispatcher objects also are assigned to default group or are left unassigned. In such cases, for all unassigned dispatchable objects including unassigned threads, all local dispatch locks are initially acquired and the usage pattern(s) of the unassigned objects is evaluated. Based on the usage pattern(s), the unassigned dispatcher objects are assigned to a specific dispatch group. During normal operation the group identifiers of all dispatcher objects involved in processing are evaluated and, if required, the group identifier is revised based on a changed usage pattern. In this way, a dispatcher object located temporally in a given dispatch group can be assigned to another dispatch group, when this temporal relationship lapses.

In a more specific embodiment of the present invention, the so-modified operating system is evaluated to determine if the modified code paths of the operating system relating to the dispatching function increases the overall performance of the multi-processor computing system to a desired or acceptable level. If the computing system's overall performance is determined not to be acceptable, then other code paths of the operating system are modified in accordance with the methodology of the present invention. Such modification continues until an acceptable level of performance has been obtained or all code paths making up the dispatching function are modified.

Also featured is an operating system embodying such a methodology and a multi-processor computing system configured with such an operating system.

Other aspects and embodiments of the invention are discussed below.

DEFINITIONS

The instant invention is most clearly understood with reference to the following definitions:

A computer readable medium shall be understood to mean any article of manufacture that contains data that can be read by a computer or a carrier wave signal carrying data that can be read by a computer. Such computer readable media includes but is not limited to computer storage media, transmission media, and paper computer media. Computer storage media includes but is not limited to magnetic media such as a floppy disk, a flexible disk, a hard disk, reel-to-reel tape, cartridge tape, cassette tape or cards; optical media such as CD-ROM and writeable compact disc; magneto-optical media in disc, tape or card form; paper computer media, such as punched cards and paper tape; or transmission media from a carrier wave signal received through a network, wireless network or modem, including radio-frequency signals and infrared signals.

BRIEF DESCRIPTION OF THE DRAWING

For a fuller understanding of the nature and desired objects of the present invention, reference is made to the following detailed description taken in conjunction with the accompanying drawing figures wherein like reference character acter denote corresponding parts throughout the several views and wherein.

DESCRIPTION OF THE PREFERRED EMBODIMENT

Figure 1:
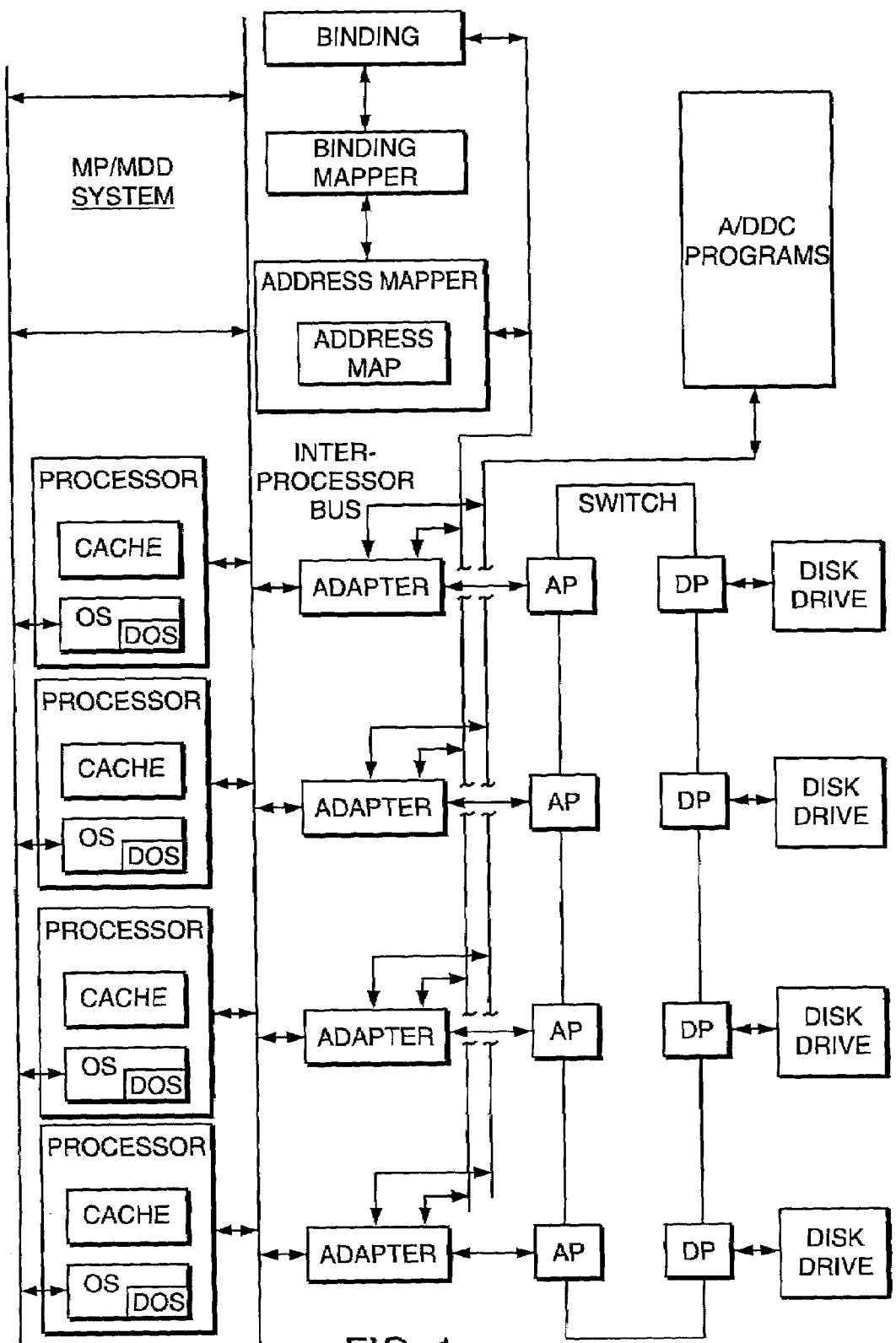
FIG. 1 is a block diagram of an exemplary multiprocessor system that implements an SMP architecture.
Figure 2:
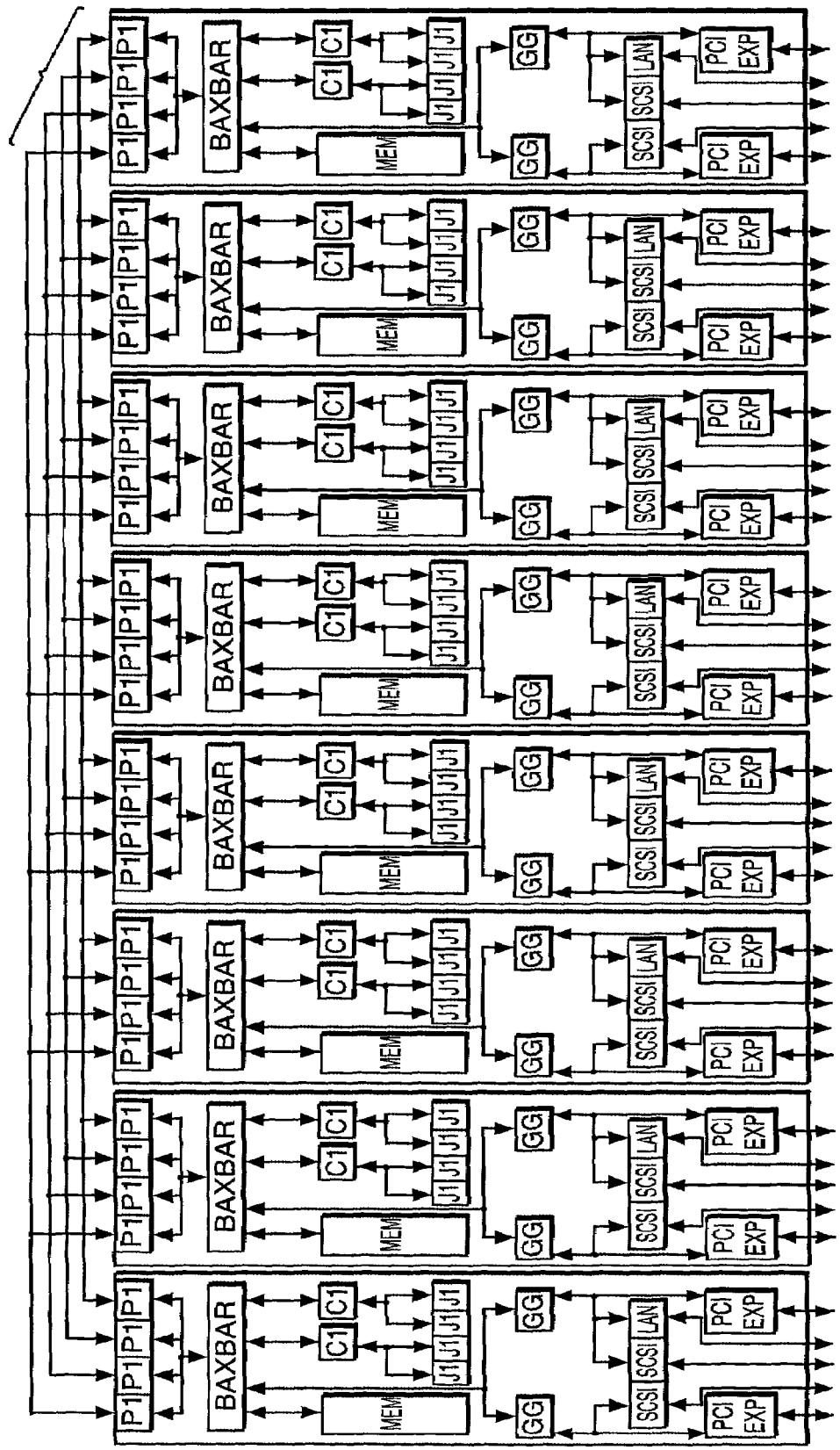
FIG. 2 is a high-level block diagram of another exemplary multiprocessor system that implements a CCNUMA architecture.
Figure 3:
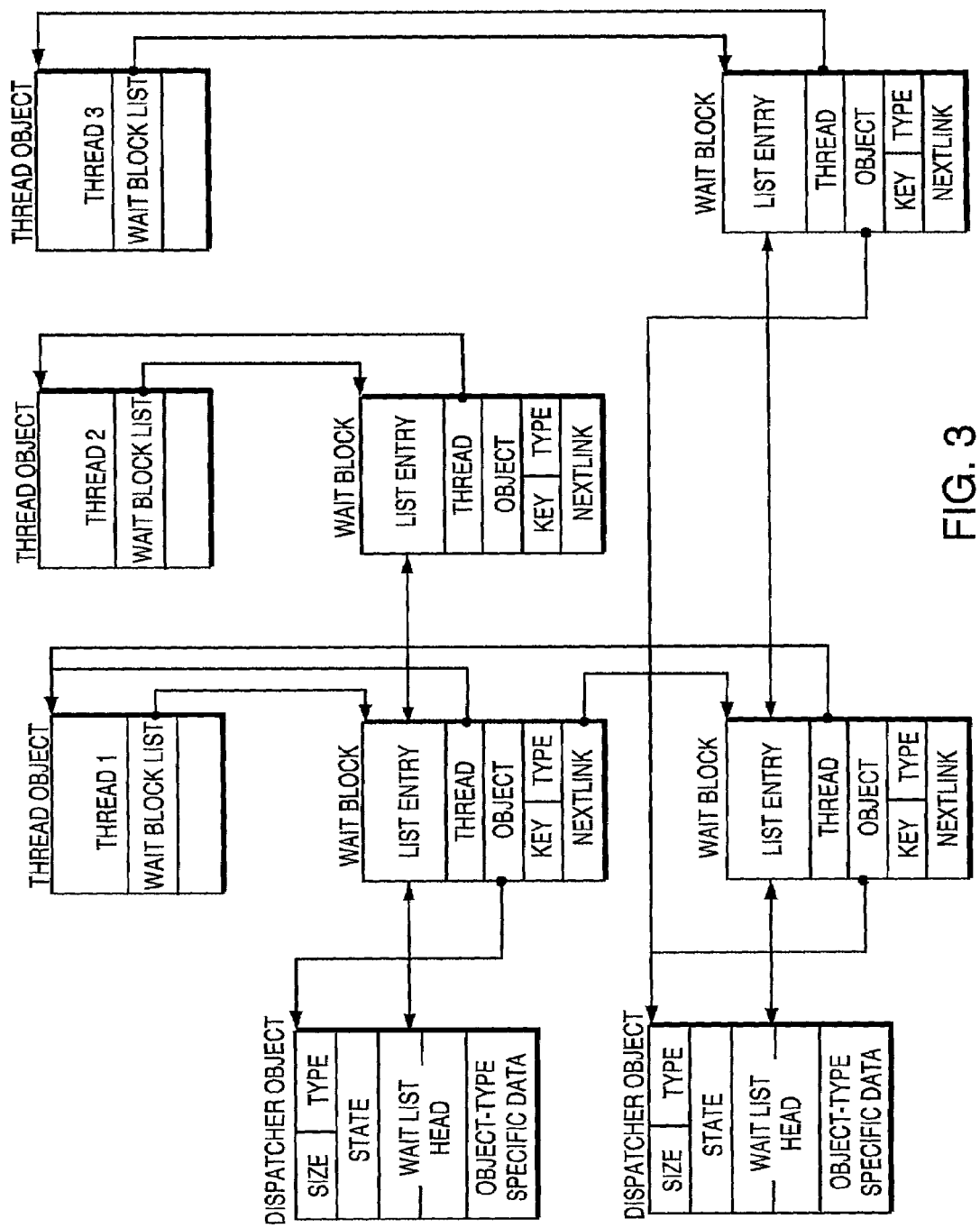
FIG. 3 is a schematic view of a illustrative wait data structures that illustrate the relationship of dispatcher objects to wait blocks to threads.
Figure 4:
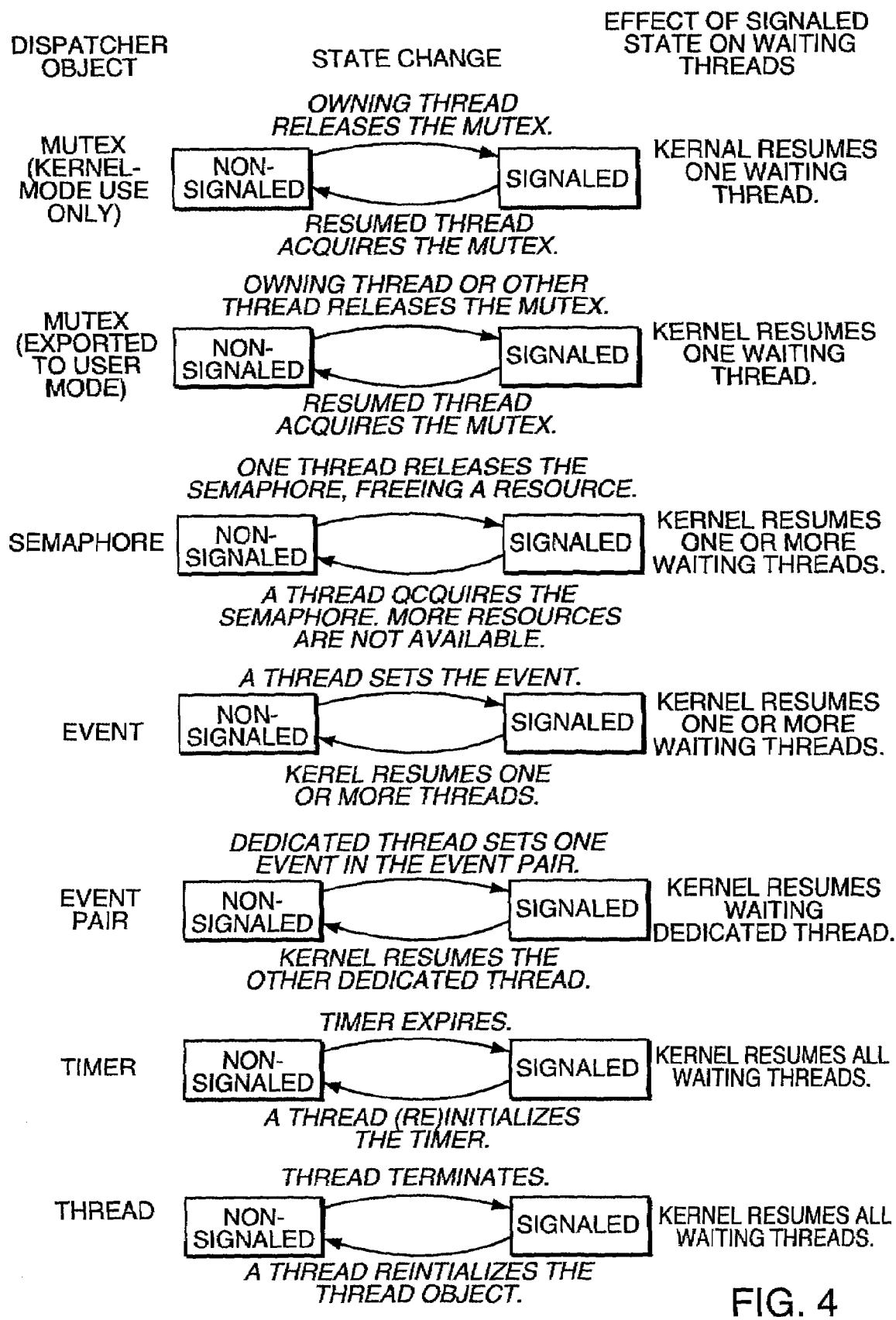
FIG. 4 is a view of some kernel dispatcher objects and the system events that induce a state change in the tread(s) waiting on the dispatcher object.
Figure 5:
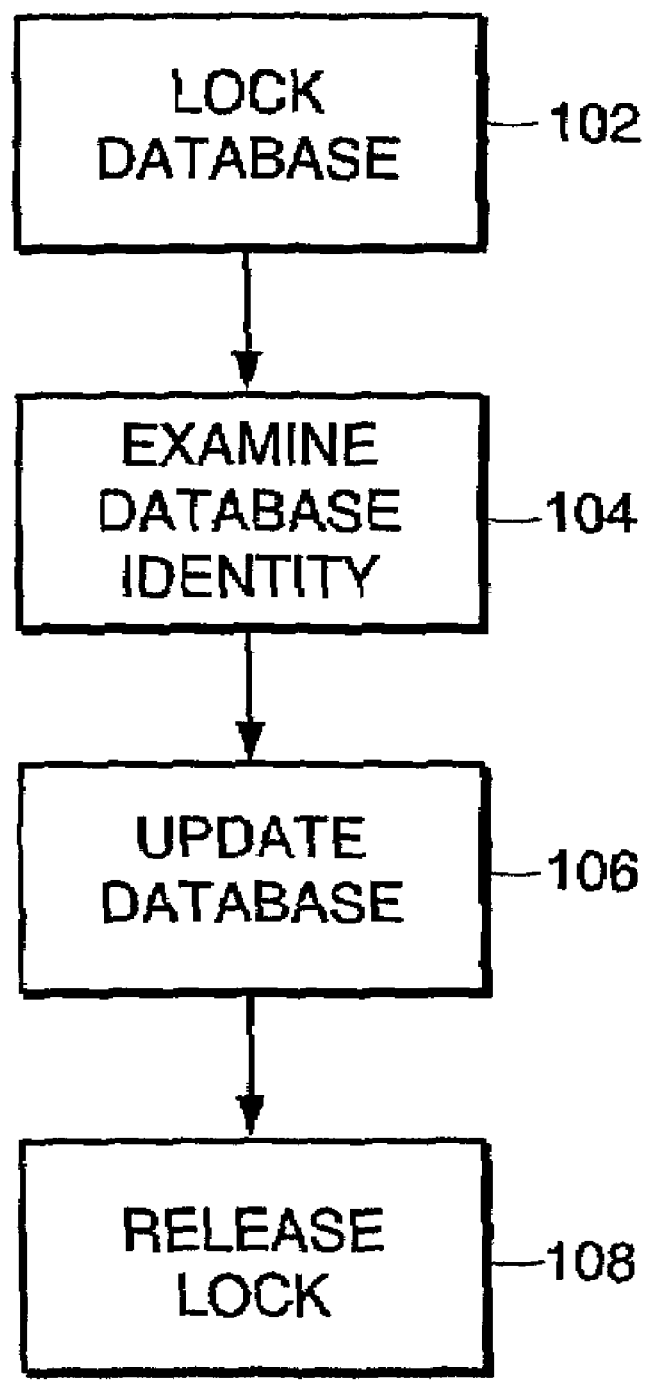
FIG. 5 is a flow diagram of a conventional technique for dispatching threads in a queue waiting for execution.
Figure 6B:
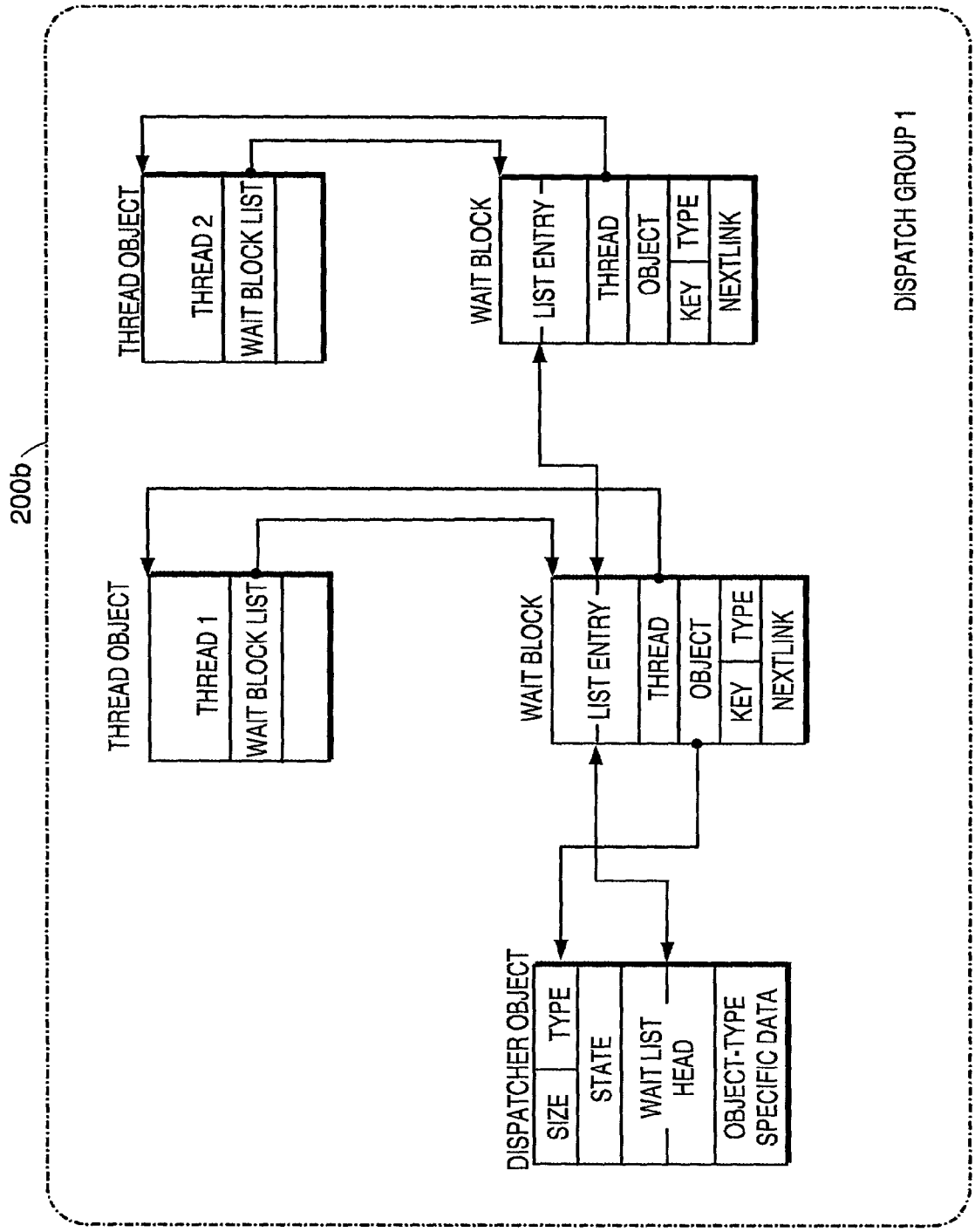
FIG. 6 is a view of an exemplary optimized SMP computing system illustrating the formation of dispatch groups.
Figure 6C:
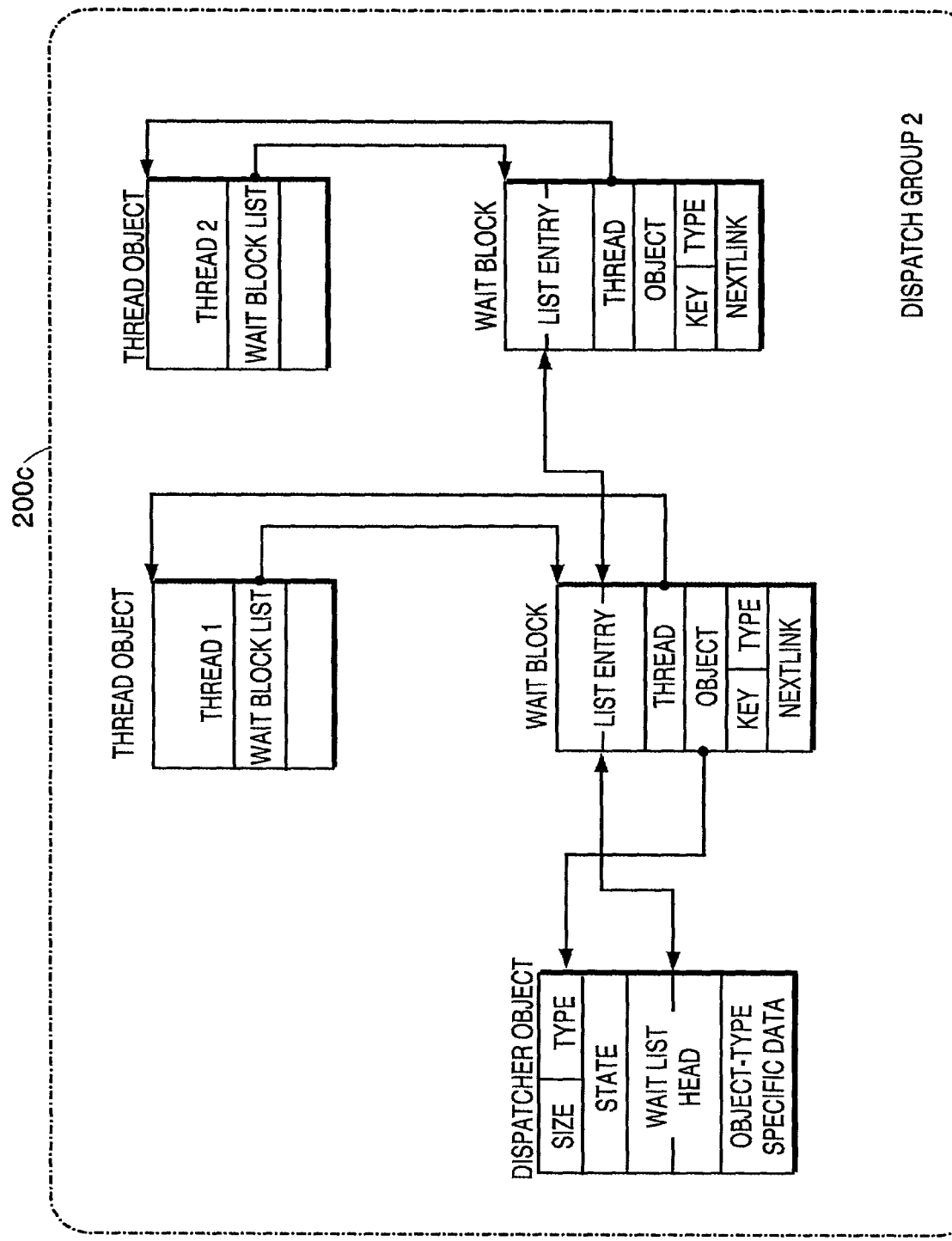
Figure 6D:
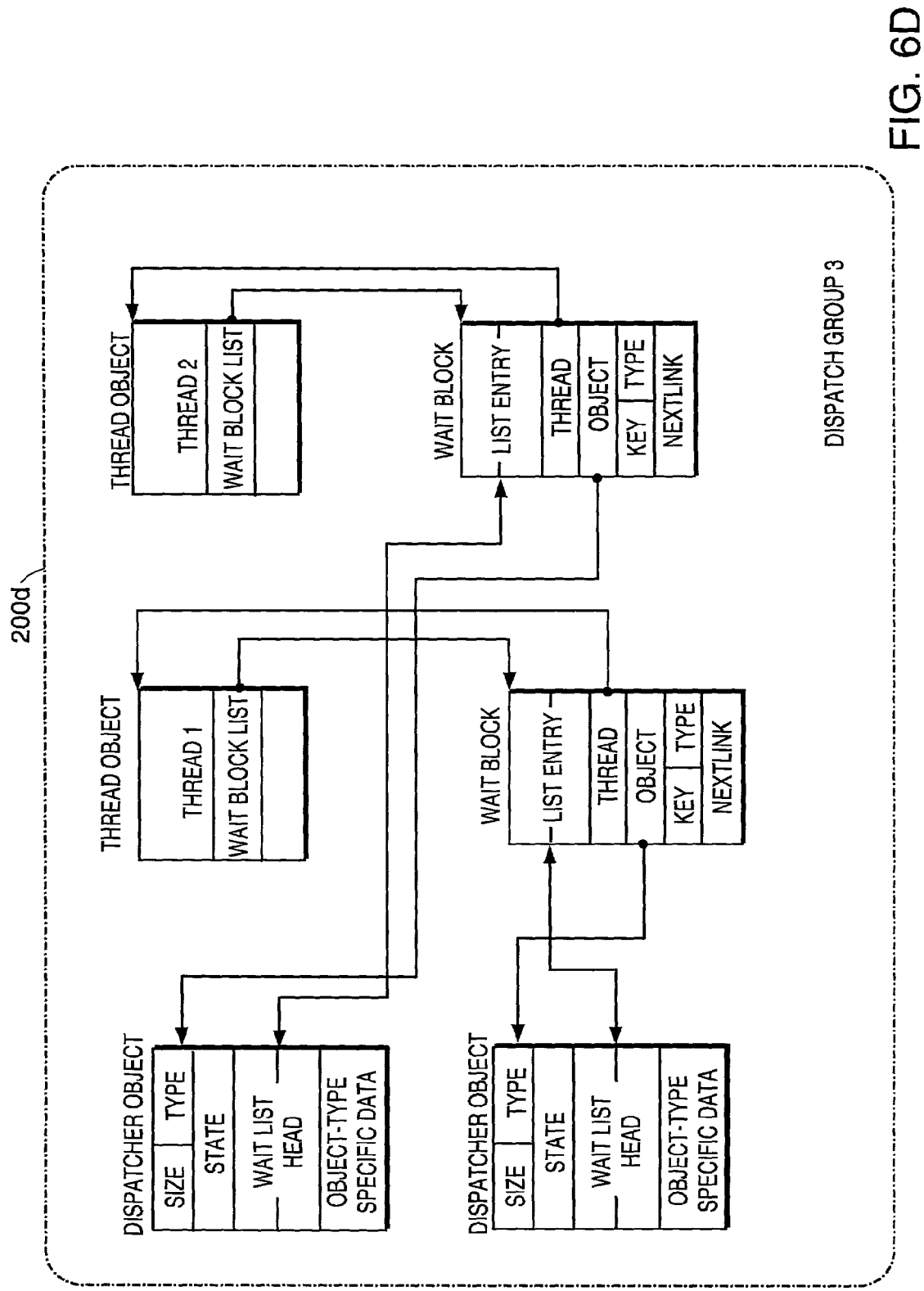

Referring now to the various figures of the drawing wherein like reference characters refer to like parts, there is shown in FIG. 6 an exemplary optimized SMP computing system illustrating the formation of distinct groups 200a–d. In a well tuned SMP, NUMA, CCNUMA or other multiprocessor environment, many kernel notifications or signaling events frequently occur between a given set of one or more resources and a given set of one or more executing threads. The collection of threads, resources, and events that frequently interact with only each other is referred hereinafter as a dispatch group. This grouping can be seen from the following illustrative example. In a multiprocessor environment, disk IO is often optimized such that only one or two processors in the system communicate with one particular disk adapter, resulting in a natural grouping of the IO threads and IO wait events. While this optimization is often configured to reduce cache thrashing or pollution, this natural grouping provides an excellent environment for dispatch grouping as well.

In general, and in accordance with the method of the present invention, a programmer(s) or software designer(s) evaluates any one or more of the computer system and/or the particular operational characteristics, functions and tasks of the software as well as the data of the data set, including the kind and type of data, that is stored in the system memory (RAM, SDRAM, etc.) of the computer system, and the various dispatchable objects. From this evaluation, the programmer determines how to group the dispatchable objects, i.e., define dispatcher groups, and in effect divide or partition the dispatcher data structure or database into subsets or partitions. In general terms, the number of dispatcher groups and the definition of the contents of each dispatcher group are established so as to provide a mechanism to redefine the locking requirements of one or more code paths of the software. The redefinition of the locking requirements of one or more code paths, further provides a mechanism for reducing contention of the highly contended global dispatcher lock that would have been provided if one used conventional software dispatching techniques for the one or more code paths. The following provides some exemplary system configurations and some exemplary grouping schemes that one skilled in the art might contemplate for use in connection with the methodology of the present invention. Such discussion also further describes the methodology of the present invention.

As a result of the attendant spatial and temporal localities in processing, the distinct groups 200a–d are frequently stable and seldom interact. Occasionally, however, kernel notification or signaling events occur across localized groups 200a–d, such as for example, an executing thread in one group 200a is waiting on a resource in another group 200c. These groups 200a–d, because of the spatial and/or temporal localities established, also respectively each form dispatch groups.

In such a case, and in accordance with the present invention, the traditional single global dispatch lock protecting all dispatch data structures and dispatch wait signaling is replaced with multiple local locks protecting separate dispatch groups, groups 0–3, hereinafter groups 200a–d, will be referred to as dispatch groups 200a–d. In addition, each dispatchable object including threads within each group is identified by or assigned a unique group identifier. For example, in the zeroth dispatch group 200a, each of the dispatachable objects would be uniquely identified as being in the zeroth group.

In an exemplary embodiment, such unique identification is implemented or accomplished as either a portion of an existing field in the dispatch header or as a new field in the dispatch header. For an exemplary dispatch header in a Windows NT environment see "Inside Windows NT:, Second Edition, pp. 132–133. A dispatch header is a well known software construct for purposes of identification a dispatchable object including threads. It is within the scope of the present invention to create such an identifier by adapting and/or using any of a number of software techniques known to those skilled in the art by which each dispatachable object falling within a given group can be so identified as being part of that group.

In the case of a NUMA or CCNUMA type of computing system, and for well tuned systems, it is not uncommon to see that most dispatching activity occurs within groups comprised of individual NUMA nodes or blocks of such nodes. Thus, the dispatch groups can be easily and naturally defined along the individual NUMA nodes or blocks of nodes in which most of the dispatching activity is being grouped. In this case, the dispatch group identifier would reflect the grouping established by the individual NUMA node or block of nodes.

The foregoing is illustrative of some operational examples of SMP or NUMA type of computing systems that lend themselves to a natural grouping of dispatchable objects into unique dispatch groups. This shall not be construed as being a limitation because the operational characteristics of any given process, the execution of threads and accessing of resources by threads and wait signaling of threads also can lend themselves to such grouping. It is equally possible, therefore that a particular implementation of an SMP computing system would derive benefit from defining dispatch groups that contain one and only one processor, such that an N processor SMP computing system would have N dispatch groups.

In one case, a temporal locality can be established for a dispatchable group because if a thread is running on a processor this thread typically will remain running on that processor even though it could be rescheduled for execution on another processor. This is one of the criterion the kernel dispatcher utilizes for rescheduling a thread. As noted above, a thread being executed can be preempted prior to completion of the designated task when the timer expires or when a higher priority threads is to be executed. In other words the dispatching criterion establishes in effect a de facto grouping. In another case, a spatial grouping is established because things, data and the like in cache and the computer readable storage medium relate to the where the data is being used in the system. Consequently, a processor running a given thread will generate a natural grouping between the processor and the data sources the thread will tend to use. In general, the thread's execution, accessing of resources, or criterion implemented by the kernel can establish a grouping of dispatchable objects.

The affinity mask for the process that defined a specific subset of the total number of available processors on which the process is to be run also can be used to create a default grouping for threads and other dispatchable objects. Alternatively, the dispatchable objects can remain unassigned. When the dispatchable objects are not assigned a unique group identifier, the operating system is configured to acquire all local dispatch locks and the global locks. The operating system also is configurable so as to evaluate the usage of the threads and dispatchable during normal operation to determine if a usage pattern(s) has developed showing the formation of a temporal locality, spatial locality or other locality upon which some or all of the unassigned dispatchable objects can be grouped. In such cases, the operating system would assign these dispatchable objects to a specific dispatch group and so identify these dispatchable objects.

In sum, each process created on a multiprocessor computing system is evaluated to determine if the dispatchable objects can be formed in one or more separate groupings. During the creation of threads for the process, the dispatchable objects including the threads are uniquely identified with a group identifier, which identifier is used to locally lock all dispatchable objects that fall within that group. When dispatchable objects of the process cannot be so-grouped, the operating system is configured to lock all local dispatch locks and/or the global dispatch lock. Such an arrangement and local locking of a dispatch groups results in an effective decrease in the overall run time for a process or applications program because the frequency of intra-group event signaling and dispatching typically occurs with much greater frequency than in the case of inter-group event signaling and dispatching.

The foregoing is illustrative of various techniques by which the dispatcher data structure can be divided or partitioned so as to form dispatch groups and by which the different dispatch groups are uniquely identified. After so defining the dispatch groups and the identification mechanism for the groups, the one or more code paths of the operating system need to be evaluated and modified to effect local locking of selective portions or partitions of the dispatcher data structure. One illustrative technique for modifying these code paths is as follows. It should be noted that reference also should be made to U.S. Ser. No. 09/675,396 filed Sep. 29, 2000, the teachings of which are herein incorporated by reference for further details concerning the following.

Figure 7:
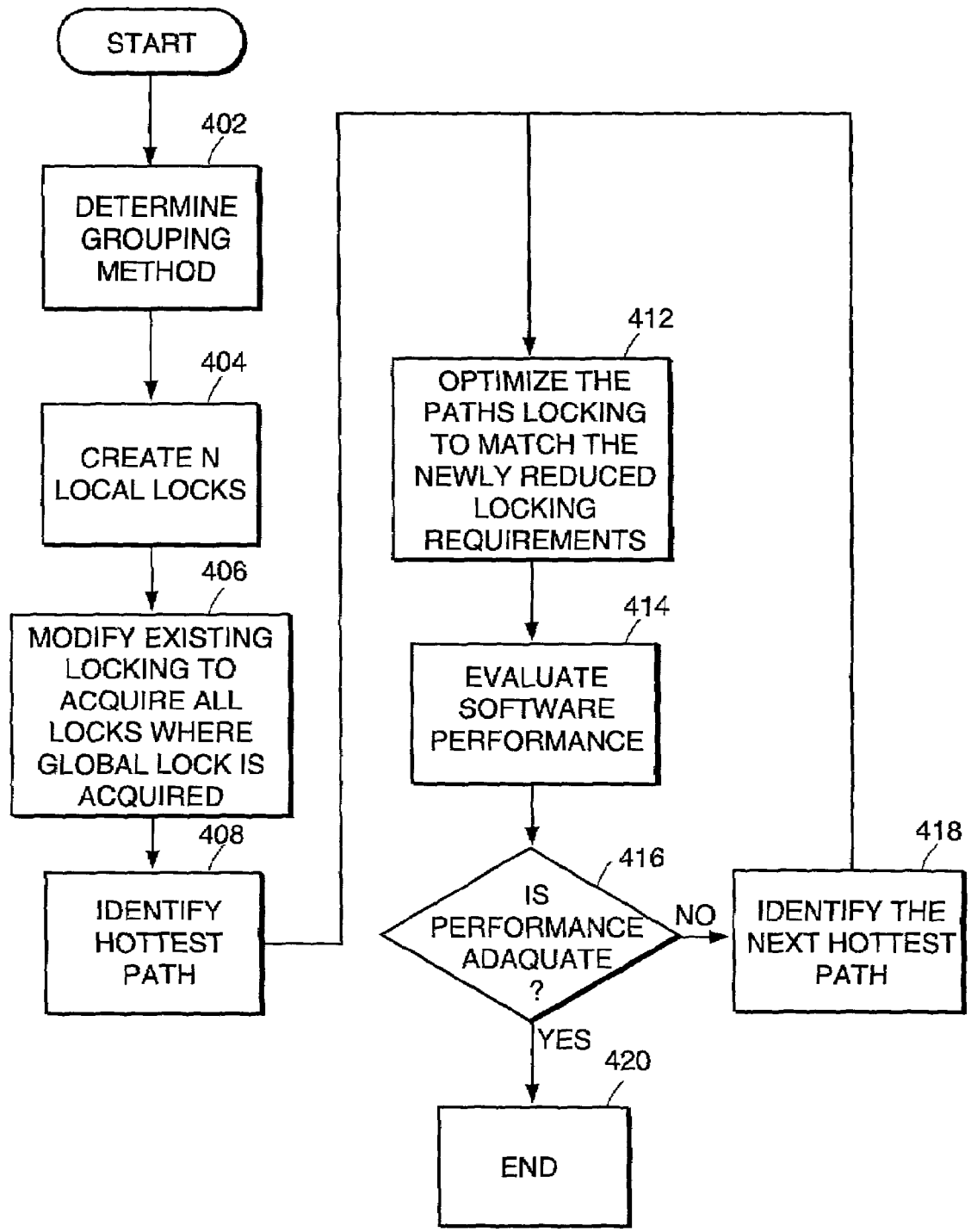
FIG. 7 is a high-level flow diagram illustrating the process or method of the present invention for optimizing an operating system.

There is shown in FIG. 7 a high-level flow diagram that illustrates the process or method of the present invention for optimizing the software of an operating system so as to reduce the contention of the highly contended dispatcher lock, a global lock, protecting multiple data items of the dispatcher database/data structure. The present method begins by determining the methodology by which the dispatchable objects are to be grouped, STEP 402, which is the process described above.

After determining the grouping method, N local dispatch locks are established or created in the software for one or more dispatchable groups in the one or more code paths of the software, step 404, where N is $\geq 1$, more particularly N is $\geq 2$. Such local locks are created with the same locking mechanism employed by the original global lock or using any other technique known to those skilled in the art that is otherwise compatible with the software code being modified or written.

Following the creation of the N local locks, the software is modified or is written such that wherever the global lock was acquired, all N local locks and the global lock are now acquired, Step 406. With this provision in the software, the data comprising the original, or initial, data set is effectively defined so as to be protected by both the global lock and all of the local locks.

Because a plurality of local locks may be held at the same time in any one or more code paths, when creating the local locks the software also shall include a locking hierarchy as is known to those skilled in the art to prevent deadlock scenarios. In an illustrative embodiment, when acquiring multiple local locks, the lowest numbered local lock is acquired first and other local locks are acquired in order through the highest numbered local lock and the global lock is acquired last. A higher numbered local lock, or the global lock, can be acquired when a lower numbered local lock is held. If a lower numbered local lock than one that is already held must be acquired, then the higher numbered local lock(s) is/are released and reacquired in the manner described above. The locks can be released in any order. As indicated above, the concept of a locking hierarchy is well understood in the field of computer science, see for example, J. W. Havender, Avoiding Deadlock in Multitasking Systems, IBM Systems Journal 7,2 (1968), 74–84.

According to one aspect of the present invention, the software comprising the operating system is written/revised so that at least selected ones of the plurality or more code paths thereof are optimized with regards to the locking requirements of these selected code paths so as to reduce the contention for acquiring the dispatcher lock(s). Thus, each of the various code paths are evaluated to determine the code path which experiences the heaviest use for dispatching, hereinafter the hottest code path, STEP 408. Such a determination is effected using any of a number of methods or techniques known to those skilled in the art, including, but not limited to instrumentation of the software, such as by the addition of counters; or analysis with commercially available tools such as VTUNE© Intel.

As indicated above, at creation the dispatchable objects of each group are identified with a group identifier. Thus, the locking requirements for the identified code path are optimized so only the locks associated with the group(s) of dispatchable object(s) required for this code path is locked, STEP 412. In other words, the locking requirements of the identified code path are modified from acquiring all locks to acquiring only the locks needed to lock the dispatchabe objects within a given group. For purposes of the present invention, a software code path according to the present invention, begins at a location in the software code that acquires the global lock (i.e., before the locking is modified), and ends when the global lock is released (i.e., before the locking is modified). The code path can branch and loop, and have multiple release points. The code paths also can share code (i.e., common routines) with other code paths.

After optimizing the locking requirements of a code path, the operating system remains functional or operational. Thus, after optimizing the locking requirements of the identified code path, the programmer(s) or software designer(s) also can perform any or a number of tests on the so-modified software to determine the overall operational performance of the modified software. Such tests can be any of a number of tests known to those skilled in the art, any of a number of tests known in the art that can be adapted for use by any one skilled in the art, or can be developed by one of ordinary skill in the art. The programmer(s) or software designer(s) also evaluate the operational performance of the software to determine if the overall performance of the software is adequate for the intended use, STEPS 414, 416. In the case where an existing, working piece of code is being modified or upgraded, the so-modified code is evaluated to determine if the overall operational performance has been improved from the earlier version of the code as intended and/or meets any improvement goals that may have been established, expected or intended. Such testing and evaluation of the operational performance is achievable, because the code path(s) where locking requirements for dispatching were not optimized, remain in operational condition as a result of the "all locks" code modification of STEP 406. In other words, dispatching and locking requirements of selected code paths can be optimized because of such grouping of dispatchable objects without effecting the operational capabilities of the other non-optimized code paths. Furthermore, this provides a mechanism by which the incremental improvement in overall performance of the software resulting from the optimization of by code path locking requirements can be determined and evaluated. Such evaluation of incremental performance also provides a mechanism to perform a cost-benefit analysis to determine if the incremental increase in performance warrants the time taken to optimize locking requirements for a working piece of software.

As indicated above, the programmer(s) or software designer(s) evaluate the overall performance of the modified software (i.e., operating system) so as to determine if the increase in performance is acceptable, STEP 416. If the overall increase is determined to be acceptable (YES, STEP 416) then the programmer(s) or software designers(s) end the process of optimizing the software to reduce the contention of a highly contended lock(s), STEP 420.

If the overall increase is determined not to be acceptable (NO, STEP 416) then the next heaviest code path (i.e., the next hottest code path) is identified, STEP 418. Thereafter, STEPS 410–416 are repeated for the next heaviest code path. This process is repeated until the overall performance of the software is determined to be acceptable (YES, STEP 416) or until the optimization process has exhausted all code paths accessing data of the date set. Thereafter, the programmer(s) or software designers(s) end the process of optimizing the software to reduce the contention of a highly contended lock(s), STEP 420.

It is not generally necessary to group all dispatchable objects of a given process to achieve reduced contention and improved performance. In order to determine the most advantageous items to partition, the most often used paths need to be identified. If these paths have multiple branches, the most commonly taken branches must be identified. The items used by the most commonly called paths and most often taken branches are the items that will typically result in the greatest reduction in contention if dispatch locking is optimized. Thus, it is not necessary to adjust the locking of all paths. The paths that are rarely called may continue to globally lock the dispatch database or structure system because they will have little or no effect on overall contention or overall system performance.

When the locking requirements for a heavily used code path is reduced by grouping of dispatchable objects, the new locking requirements must be determined and the path modified to only acquire the necessary locks. The correct locking may be any combination of local dispatch locks with or without the global lock, or it may be all locks. The code path determines the correct locking by reading the locales of the items it will touch. The path may or may not be able to determine ahead of time what branch will be taken. It may be possible to lock a group(s) of dispatchable objects and wait until later in the path to adjust the locking as needed consistent with the established locking hierarchy. If the items in the path are used in such a way that this is not appropriate then the lock must be acquired at the beginning of the path even if it is not required by the branch that is taken.

Through this process of grouping of dispatchable objects and adjusting the dispatching locking for the important paths, the so-modified/updated software becomes more distributed and contention for the global dispatching lock is reduced. It is useful to note that after each step of grouping and optimizing the dispatch locking, the software remains in working condition and the performance and lock contention can be measured.

Figure 8A:
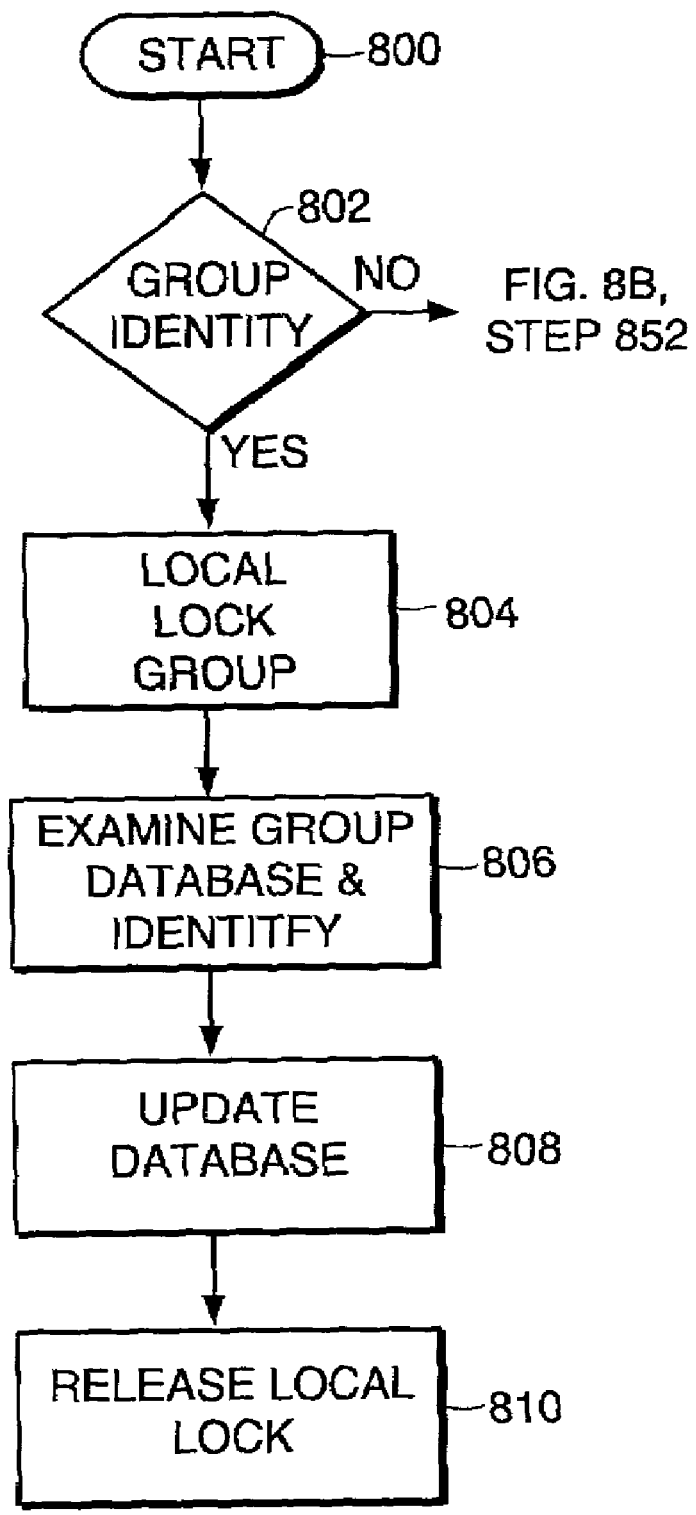
FIGS. 8A,B is a high level flow diagram illustrating the process followed to signal kernel events or reschedule execution of a thread and to update the data structures associated with dispatching.

Referring now to FIGS. 8A,B there is shown there is shown a high level flow diagram illustrating the process followed to signal kernel events and reschedule execution of a thread and to update the data structure associated with dispatching to illustrate an exemplary locking routine for a code path of the operating system, one path for local locking and another path for global locking. After starting dispatching, STEP 800, the process determines if the dispatchable object, such as a thread or kernel event, is within a dispatch group, namely is there a group identifier present, STEP 802. If there is a dispatch group (YES, STEP 802) then the operating system acquires a local lock over all of the dispatchable objects within the identified group, STEP 804. As to other dispatchable objects not within the dispatch group and thus not subject to the local lock, these other objects remain accessible to the operating system. Although the foregoing is descriptive of a process where a single dispatch group is identified, it is within the scope of the present invention for the foregoing process to apply in cases where the kernel determines that dispatchable objects from multiple groups are involved in the operation. In such cases, and following the rules of hierarchal locking, the operating system acquires all necessary local locks over all of the dispatchable objects within the identified multiple groups.

The kerenel/dispatcher examines the locked portion of the dispatch database/database structure for the identified dispatch group or groups and identifies the next thread to be executed, STEP 806. This determination is achieved using any of a number of techniques and criteria known to those skilled in that art and is typically particular to the specific operating system. As noted above, some illustrative criterion are provided in Chapter 4 of "Inside Windows NT" for the scheduling of threads. In a multiprocessor computing system, such identification also includes identifying the processor on which the released or readied thread is to be executed.

The kernel/dispatcher then updates the dispatch database for the items falling within the confines of the identified dispatch group or groups, STEP 808. For example, the kernel updates the database to note the change in state of the thread to be executed on a processor or the change in state of a kernel event from unsignaled to signaled. The kernel also would evaluate the wait list or wait list structure and update it based on the actions taken to pre-empt or stop the thread that had been running. If it is determined that the thread, which had been pre-empted or otherwise stopped (e.g., timer expiring), is to continue running then the kernel would update the database based on the added quantum or time the thread is to be run. Once, all of the updating and evaluating is completed, the kernel releases the local lock(s), STEP 810 acquired over the dispatchable items of the identified dispatch group(s). Thereafter, the identified readied or released thread of the identified dispatch group is executed on the identified processor.

Figure 8B:
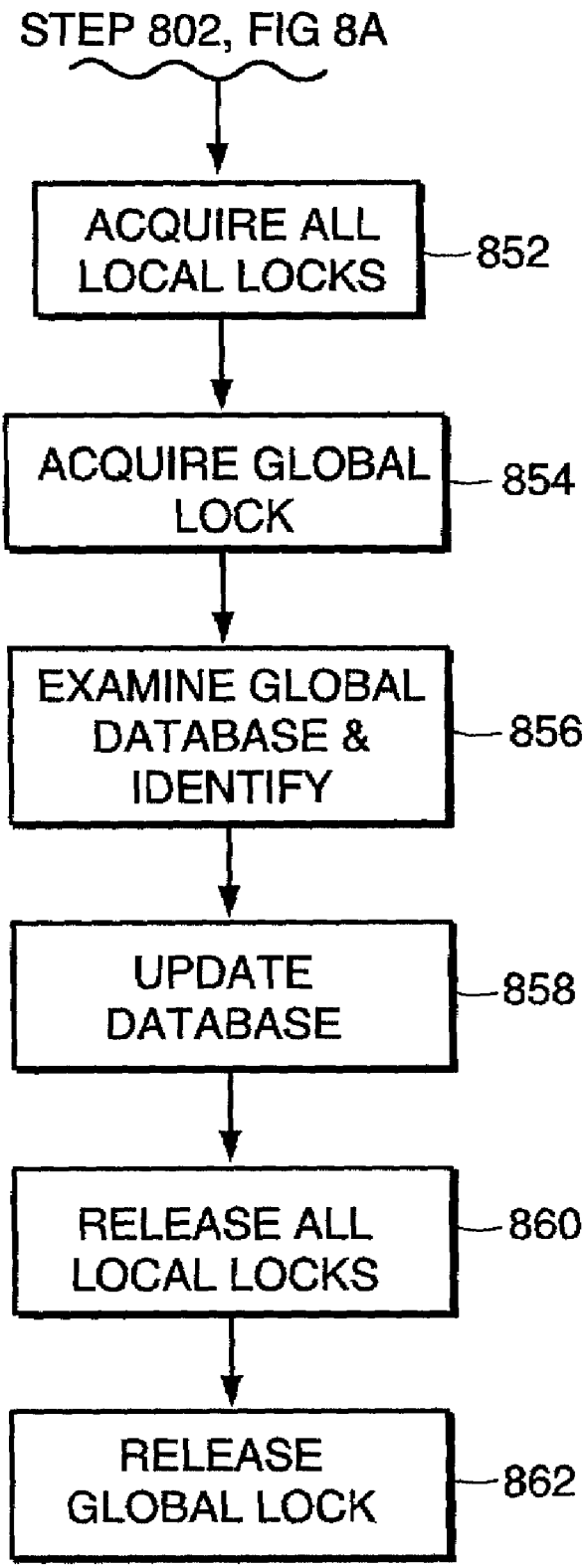

If a dispatch group is not identified (NO, STEP 802) then the operating system acquires all local locks over all of the dispatchable objects within all dispatch groups of all processes presently being run on the multiprocessor computing system, STEP 852 (FIG. 8B) starting with first local lock and continuing until reaching the Nth local lock and then acquires a global lock, STEP 854.

After acquiring all of the local locks and the global lock, all of the dispatchable objects are locked for all running processes. In other words all items of the dispatch database or dispatch data structure are inaccessible to all other competing dispatching operations except to the dispatching operation presently being performed.

The kerenel/dispatcher examines the dispatch database/database structure and identifies the next thread to be executed, STEP 856. See also the discussion above for STEP 806 for further details. The kernel/dispatcher then updates the dispatch database for the items falling within the confines of the identified dispatch group, STEP 858. Once, all of the updating and evaluating is completed, the kernel releases all of the local locks, STEP 860 and then releases the global lock. Thereafter, the identified readied or released thread of the identified dispatch group is executed on the identified processor. The release of the local and global locks then frees up the dispatcher so that it can handle any dispatching operations that were pended or stayed while the all-locks process proceeded to completion.

As noted above, the modification of the software for the operating system to acquire all-locks (all local and global locks), maintains the operating system in an operational state, functionally equivalent to the original state of the unaltered operating system. Such an operational state of the operating system is maintained even in cases where other activities or actions are taken in accordance with the teachings of the present invention to optimize locking requirement in selected ones of the plurality or more of code paths.

Although the foregoing describes a process whereby all of the code paths relating to dispatching need not be modified, it is within the scope of the present invention to modify all such dispatching code paths.

Although a preferred embodiment of the invention has been described using specific terms, such description is for illustrative purposes only, and it is to be understood that changes and variations may be made without departing from the spirit or scope of the following claims.

What is claimed is:

1. A method for reducing contention of a highly contended dispatcher lock protecting data items of a dispatcher database of an operating system for a multi-processor computer system, said method comprising the steps of:
forming one or more dispatch groups including any of threads, resources, and events that frequently interact with each other;
creating N local locks, one for each dispatch group, where $N \geq 2$;
relating each dispatchable object to its dispatch group;
modifying the locking requirements of all code paths of the one or more code paths of the operating system so that the local locks being acquired and released in each of said all code paths are those associated with dispatchable objects touching the code paths;
evaluating the operating system after said modifying the locking requirements so as to determine if the overall performance of the operating system is acceptable based upon user-selected criteria;
when overall performance of the operating system is unacceptable, counting usage of all the code paths to determine a heaviest path, wherein the heaviest path has a highest usage; and
remodifying the heaviest code path.

2. The method according to claim 1, wherein said relating includes:
separately identifying each dispatch group with a unique identifier; and
identifying each dispatchable object of each group with said unique identifier.

3. A method for reducing contention of a highly contended dispatcher lock protecting data items of a dispatcher database of an operating system for a multi-processor computer system, said method comprising the steps of:
forming one or more dispatch groups including dispatchable objects that include any of threads, resources and events, wherein the one or more dispatch groups are formed based upon a natural usage pattern;
creating N local locks, one for each dispatch group, where $N \geq 1$;
relating each dispatchable object to its dispatch group;
modifying the locking requirements of each of one or more code paths of the operating system so as to acquire all N local locks and a global lock where the dispatcher lock would have been acquired and so as to release all N local locks and the global lock where the dispatcher lock would have been released;
identifying one code path from the one or more code paths of the operating system; and
optimizing the locking requirements of the identified code path so one or more local locks are acquired and released in the identified code path, the one or more code paths being those associated with the dispatchable objects of the one or more dispatch groups touched by the identified code path.

4. The method according to claim 3, wherein the identified code path includes a plurality of branches, and wherein said optimizing includes optimizing the locking requirements of the identified code path so the one or more locks being acquired and released in the code path are those associated with the dispatchable objects being touched by each branch of the identified code path.

5. The method according to claim 4, wherein said optimizing includes optimizing the locking requirements of each branch of the identified code path so the one or more locks being acquired and released in each branch are those associated with the dispatchable objects being touched by said each branch.

6. The method according to claim 3, further comprising the step of evaluating the modified operating system after said optimizing the locking requirements so as to determine if the overall performance of dispatching and wait signaling of the operating system is acceptable.

7. The method according to claim 6, wherein in the case where said evaluating determines that the overall performance is not acceptable, then said method includes identifying another code path of the one or more code paths and repeating said steps of optimizing and evaluating for the another identified code path.

8. The method according to claim 7, wherein the code path first identified is the heaviest used code path and wherein the another code path and subsequent code paths are identified sequentially in the direction from the heaviest used code path to a lesser used path.

9. The method according to claim 3, wherein there is one of a plurality or a multiplicity of code paths that access one or more dispatchable objects.

10. A parallel dispatch waiting signaling method for updating a dispatcher database of an operating system for a multiprocessor computing system, the method comprising the steps of:
   defining one or more dispatch groups, each dispatch group including dispatchable objects, made up of any of threads, resources or events that are temporally and spatially related;
   defining one or more local locks, one for each dispatch group;
   relating each dispatchable object to its corresponding dispatch group;
   determining if the dispatchable object of an updating operation belongs to a dispatch group;
   acquiring one of the one or more local locks, thereby locking a portion of the dispatcher database corresponding to the dispatch group;
   updating the dispatcher database portion; and
   releasing the local lock following updating,
wherein in the case where said determining determines that the dispatchable object of the updating operation does not belong to a dispatch group, then further comprising the steps of:
   acquiring all locks thereby locking the dispatcher database;
   updating the dispatcher database; and
   releasing all locks following updating.

11. The method according to claim 10, wherein:
   said relating includes:
   separately identifying each dispatch group with a unique identifier; and
   identifying each dispatchable object of each group with said unique identifier; and
   said acquiring includes acquiring the one of the local locks for the dispatch group corresponding to the unique identifier.

12. The method according, to claim 10, wherein all locks being acquired includes all local locks and a global lock.

13. The method according to claim 10, wherein while acquiring the one of the one or more local locks, other portions of the dispatcher database are unlocked.

14. A parallel dispatch waiting signaling method for updating data items of a dispatcher database of an operating system for a multiprocessor computing system, the method comprising the steps of:
   forming one or more dispatch groups including dispatchable objects that include any of threads, resources and events from a spatial locality;
   creating N local locks, one for each dispatch group, where $N \geq 2$;
   relating each dispatchable object to its dispatch group;
   identifying one code path from the one or more code paths of the operating system;
   optimizing the locking requirements of the identified code path so one or more local locks are acquired and released in the identified code path, the one or more code paths being those associated with the dispatchable objects of the one or more dispatch groups touched by the identified code path; and
   determining if the dispatchable object of an updating operation belongs to a dispatch group;
   acquiring one of the N local locks, thereby locking a portion of the dispatcher database corresponding to the dispatch group;
   updating the dispatcher database portion; and
   releasing the local lock following updating.

15. The method according to claim 14, wherein:
   said relating includes:
   separately identifying each dispatch group with a unique identifier; and
   identifying each dispatchable object of each group with said unique identifier; and
   the one of the N local locks being acquired corresponds to the lock for the dispatch group corresponding to the unique identifier.

16. The method according to claim 14 further comprising the step of modifying the locking requirements of each of one or more code paths of the operating system that are not optimized so as to acquire all N local locks and a global lock where a dispatcher lock of the operating system would have been acquired and so as to release all N local locks and the global lock where the dispatcher lock would have been released.

17. The method according to claim 14, wherein in the case where said determining determines that the dispatchable object of the updating operation does not belong to a dispatch group, then said method further comprises the steps of:
   acquiring all N locks and a global lock thereby locking the dispatcher database;
   updating the dispatcher database; and
   releasing all N local locks and the global lock following updating.

18. The method according to claim 14, wherein locking requirements for a plurality of code paths are optimized, and wherein said acquiring, updating and releasing are selectively effected in any one of the plurality of code paths provided that the dispatchable objects to be locked in said any one code path are not locked in any other of the plurality of code paths.

19. The method according to claim 14, wherein while the one of the N local locks is acquired, other portions of the dispatcher database are unlocked.

20. An operating system for execution in computer system including a plurality of processors, the operating system including program code, the program code including a sequence of instructions and criteria for protecting and updating data items of a dispatcher database, said sequence of instructions and criteria including defining one or more dispatch groups, each dispatch group including dispatchable object, made up of any of threads, resources or events that are in a temporal locality;

defining one or more local locks, one for each dispatch group;

relating each dispatchable object to its corresponding dispatch group;

determining if the dispatchable object of an updating operation belongs to a dispatch group;

acquiring one of the one or more local locks to thereby lock a portion of the dispatcher database corresponding to the dispatch group;

updating one or more data items of the locked dispatcher database portion; and releasing the local lock following updating, wherein said sequence of instructions and criteria concerning relating each dispatchable object to its corresponding dispatch group includes separately identifying each dispatch group with a unique identifier; and identifying each dispatchable object of each group with said unique identifier; and wherein said sequence of instructions and criteria concerning acquiring one of the one or more local locks includes acquiring the one of the one or more local locks for the dispatch group corresponding to the unique identifier.

21. The operating system of claim 20, wherein in the case where said sequence of instructions and criteria for determining determines that the dispatchable object of the updating operation does not belong to a dispatch group, said program code further includes sequence of instructions and criteria for:

acquiring all locks thereby locking the dispatcher database;

updating the dispatcher database; and releasing all locks following updating.

22. The operating system of claim 21, wherein all locks being acquired includes all local locks and a global lock.

23. The operating system of claim 20, wherein while acquiring the one of the one or more local locks, other portions of the dispatcher database are unlocked.

24. A computer program product comprising:

program code, stored on computer storage media, for protecting and updating data items of a dispatcher database of an operating system of a multi-processor computer system, the program code including:

a first computer-readable program code segment for causing the computer system to:

(a) define one or more dispatch groups, each dispatch group including dispatchable objects, made up of any of threads, resources or events that are in a temporal locality and a spatial locality;

(b) define one or more local locks, one for each dispatch group;

(c) relate each dispatchable object to its corresponding dispatch group;

(d) separately identify each dispatch group with a unique identifier; and (e) identify each dispatchable object of each group with said unique identifier;

a second computer-readable program code segment for causing the computer system to:

(f) determine if the dispatchable object of an updating operation belongs to a dispatch group; and a third computer-readable code segment for causing the computer system to:

(g) acquire one of the one or more local locks to thereby lock a portion of the dispatcher database corresponding to the dispatch group; and (h) acquire the one of the one or more local locks for the dispatch group corresponding to the unique identifier.

25. The computer program product of claim 24 wherein the first code segment includes instructions and criteria to:

separately identify each dispatch group with a unique identifier, and identify each dispatchable object of each group with said unique identifier.

26. The computer program product of claim 24 wherein:

the first code segment includes instructions and criteria to:

separately identify each dispatch group with a unique identifier, and identify each dispatchable object of each group with said unique identifier; and the second code segment includes instructions and criteria to determine if the disapatchable object belongs to the dispatch group using the unique identifier.

27. The computer program product of claim 24, wherein the third code segment includes instructions and criteria that, while acquiring the one of the one or more local locks, other portions of the dispatcher database are to be unlocked.

28. The computer program product of claim 24 further including a fourth computer-readable code segment for causing the computer system to:

(f) update one or more data items of the locked dispatcher database portion; and (g) release the acquired local lock following updating.

29. The computer program product of claim 28, wherein when it is determined by the second code segment that the dispatchable object of the updating operation does not belong to a dispatch group, said third and fourth code segments further includes instructions and criteria for:

acquiring all locks thereby locking the dispatcher database;

updating the dispatcher database; and releasing all locks following updating.

30. The method according to claim 29, wherein the all locks being acquired includes all local locks and a global lock.

31. A multiprocessor computer system comprising:

a plurality of processors;

a physical memory accessed and used by the plurality of processors;

program code for execution within the plurality of processors; and wherein the program code comprises criteria and a sequence of instructions to protect and update data items of a dispatcher database, said instructions and criteria including:

defining one or more dispatch groups, each dispatch group including dispatchable object, made up of any of threads, resources or events that are in a temporal locality and a spatial locality;

defining one or more local locks, one for each dispatch group;

relating each dispatchable object to its corresponding dispatch group;

determining if the dispatchable object of an updating operation belongs to a dispatch group;

acquiring one of the one or more local locks to thereby lock a portion of the dispatcher database corresponding to the dispatch group;

updating one or more data items of the locked dispatcher database portion; and releasing the local lock following updating wherein in the case where the program code criteria and sequence of instructions for determining determines that the dispatchable object of the updating operation does not belong to a dispatch group, the program code criteria and sequence of instructions includes:

acquiring all locks thereby locking the dispatcher database;

updating the dispatcher database; and releasing all locks following updating.

32. The multiprocessor computer system of claim 31, wherein the program code criteria and sequence of instructions concerning relating each dispatchable object to its corresponding dispatch group includes separately identifying each dispatch group with a unique identifier; and identifying each dispatchable object of each group with said unique identifier; and wherein the instructions and criteria concerning acquiring one of the one or more local locks includes acquiring the one of the one or more local locks for the dispatch group corresponding to the unique identifier.

* * * * *